ALL RELAY TELEPHONE SELECTOR

INVENTOR.
ROY W. JONES
BY *Winfred T. Powell*
ATTORNEY

ALL RELAY TELEPHONE SELECTOR

Filed July 22, 1948 2 Sheets-Sheet 2

INVENTOR.
ROY W. JONES
BY Winfred T. Powell
ATTORNEY

Patented June 27, 1950 2,512,942

UNITED STATES PATENT OFFICE 2,512,942

ALL RELAY TELEPHONE SELECTOR

Roy W. Jones, Rochester, N. Y., assignor to Stromberg-Carlson Company, a corporation of New York Application July 22, 1948, Serial No. 40,117

12 Claims. (Cl. 179—18)

Figure 1:
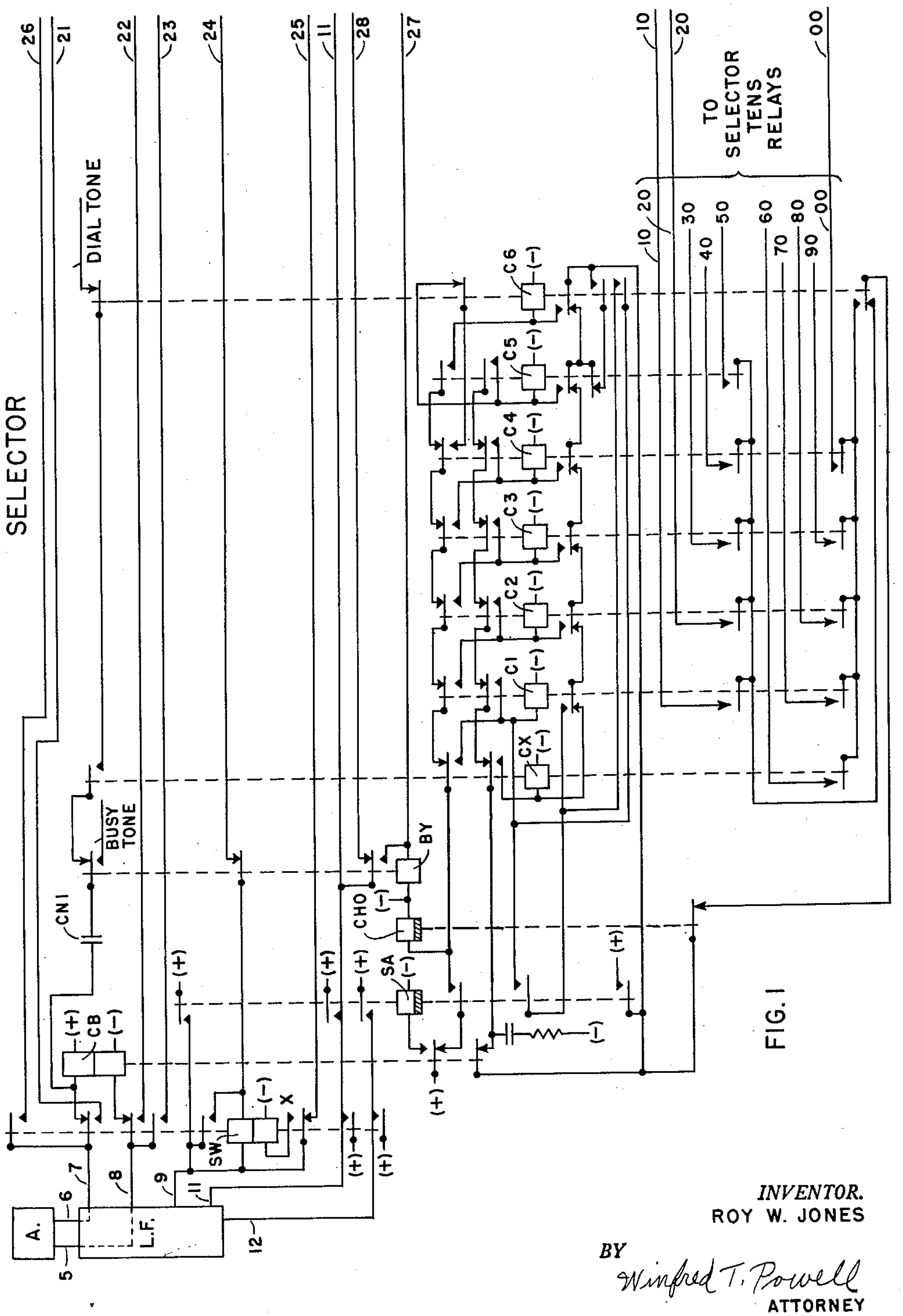

This invention relates to telephone systems and it more particularly pertains to all relay type selectors used in automatic telephone systems.

In previous all relay type selectors, the selection of the idle trunk in the selected group or level was usually by means of a marking arrangement. That is, when the dial stops in response to the dialing of the digit associated with the wanted level, a marking condition is set up and an allotter arrangement is used to allot the idle trunk of the group for operating the proper group and units selecting relays of the selector in accordance with the idle trunk selected. This is a marking arrangement.

Another arrangement for selecting idle trunks in an outgoing group or level from a selector of the all relay type, is the provision of stepping relays associated with the selector, these selector relays operating in a step by step manner for selecting the idle trunk in the desired group. This is a step by step selecting arrangement. Such an arrangement is disclosed in Powell application Serial No. 642,917, filed January 23, 1946.

It is an object of the present invention to make use of a reflex circuit in which the trunk selecting relays in an all relay step by step trunk selector are operated in a reflex manner for selecting any one of the usual ten outgoing trunks in a selected group. By "reflex" is meant sequentially operating a series of relays until the last relay of the series is operated, after which the relays are reoperated in sequence, starting again with the first relay of the series. Through the use of this reflex circuit, the number of relays required for selecting the trunks in the desired group is considerably reduced over such systems of the prior art.

The novel features believed to be characteristic of the invention will be set forth in the appended claims. The invention, both as to its organization and method of operation, together with further objects and advantages thereof will be better understood by a consideration of the following specification taken in connection with the accompanying drawings in which Figs. 1 and 2 are arranged in the order named and with correspondingly numbered lines in alignment.

For the purpose of simplifying the drawings and facilitating the explanation, the various parts and circuits constituting the embodiment of the invention have been shown diagrammatically and certain conventional illustrations have been employed, the drawings having been made more with the purpose of making it easy to understand the principles and mode of operation than with the idea of illustrating the specific construction and arrangement of parts that would be actually employed in practice. For example, the various relays and their contacts are illustrated in a conventional manner with all of the contacts controlled by a particular relay being associated with this relay by means of dashed lines. The telephone and line finder are shown in block diagram, since the particular arrangement and circuit connections of these two items are immaterial to the operation of the disclosed selector. The telephone is indicated by a rectangle A and the line finder by rectangle LF. The negative side of the common exchange battery is indicated by (—) and the positive side of the exchange battery, which is usually grounded, is indicated by (+).

Figure 2:
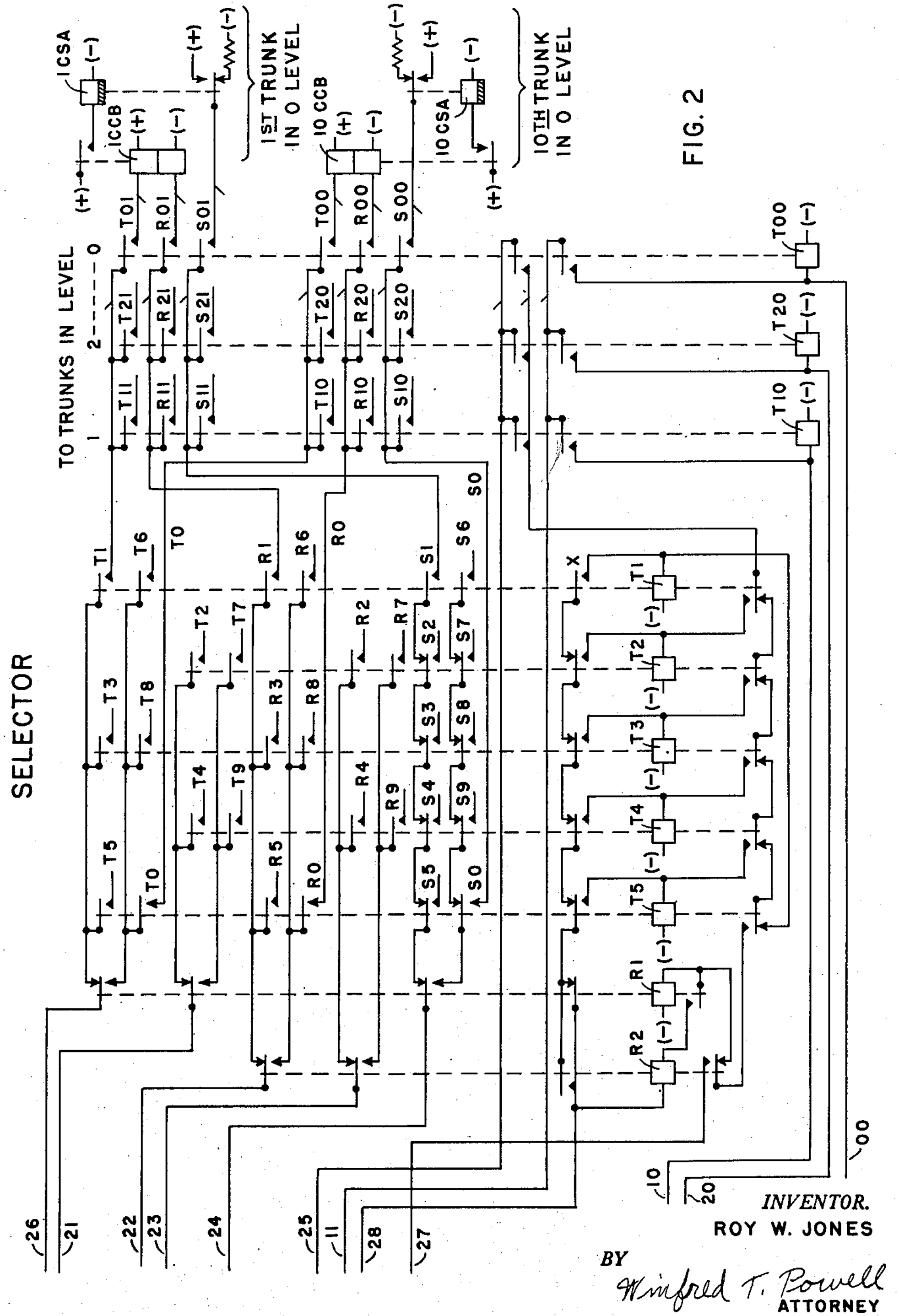

Two of the relays for each of a pair of trunks of the 0 level selected by the selecting relays of Fig. 2 are illustrated in the right hand portion of this figure. These are the battery feed and delay relays and are shown to indicate how the idle trunk is selected and then made busy in response to trunk selection. It will be understood that each of these trunks has numerous other relays (or an automatic switch) for operation in response to the dial impulses transmitted after the particular trunk is selected. It will also be understood that there are numerous other trunks selected by the selecting relays of the selector of Fig. 2 some of which are indicated by reference characters having numerals indicating the number of the trunk. For example, the operation of relay T10 of Fig. 2 connects the tip, ring and sleeve conductors of all trunks in the first level to the common wires leading to contacts of relays R2—R1 and T5—T1, these latter relays making the individual trunk selection of the group. The other group relays, T20 and T00 being shown, connect all of the trunks of the associated level to these same common wires for individual selection. The first digit of the relay indication indicates the level or group of trunks selected.

It is believed that the invention will be better understood by explaining in detail the circuit operations when a connection is extended from calling substation A, by way of line finder LF, to the selector illustrated in Figs. 1 and 2. It will first be assumed that digit 0 is dialed for selecting the first idle trunk in the 10th level, after which a brief explanation will be given of the circuit operations effected when other digits are dialed.

When the selector is seized in response to the initiation of a call from substation A, calling bridge relay CB is operated over a circuit extending from (+), upper winding of relay CB, break contact of switching relay SW, conductor 7, through the line finder, tip line conductor 6, substation A, ring line conductor 5, through the line finder, conductor 8, break contact of relay SW and lower winding of relay CB to (—). The operation of relay CB closes an obvious circuit for operating slow acting relay SA. Relay SA applies (+) to sleeve conductor 9 leading back through the line finder for operating the cut off relay of the calling line. Relay SA also applies (+) to locking conductor 11 for locking the line finder in its operated position. Relay SA also applies (+) to allotter conductor 12, this (+) being used in certain relay type systems for making the allotted link busy until the release of the connection.

The first counting relay CX of the counting relay group is now operated for preparing the counting relays for the first digit. Relay CX is operated over a circuit extending from (+), lowermost make contact of relay SA, break contacts of relays C6 to C1 inclusive and winding of relay CX to (—). Dial tone is now connected to the calling line over a circuit extending from the dial tone source, break contact of counting relay C6, make contact of relay CX, break contact of busy relay BY, condenser CN1, break contact of relay SW, conductor 7 and over the remainder of the previously described circuit to the calling substation.

It will be assumed that the calling subscriber dials 0 for selecting a trunk in the tenth level. In response to this operation the line circuit is intermittently opened ten times for effecting the intermittent release of relay CB for repeating the ten impulses to the counting relay group. The first release of relay CB closes a circuit for operating relay C1 extending from (+), break contact of relay CB, make contact of relay SA, make contact of relay CX and winding of relay C1 to (—). The winding of relay CH0 is connected to this circuit so that this relay is operated at the beginning of the impulse transmission. Relay C1 closes a first locking circuit for itself extending from (+), lowermost make contact of relay SA, break contacts in series of relays C6 to C2 inclusive, make contact of relay C1, make contact of relay SA and winding of relay CT to (—). The release of relay CB to mark the beginning of the first impulse of the series closes a locking circuit for relay CX preventing the release of this relay when relay C1 operates in response to the release of relay CB. This locking circuit may be traced from (+), lowermost make contact of relay SA, break contact of relay CB, make contact and winding of relay CX to (—). When relay CB operates to mark the end of the first impulse of the series the above described circuit for relay CX is opened at the lowermost break contact of relay CB for effecting the release of relay CX. The release of relay CX disconnects dial tone from the calling line.

When relay CB releases to mark the beginning of the second impulse a second locking circuit is closed for relay C1 extending from (+), lowermost make contact of relay SA, break contact of relay CB, break contact of relay CX, make contact and winding of relay C1 to (—). This second locking circuit is effective to hold relay C1 energized when relay C2 is operated in response to the beginning of the second impulse, at which time relay C2 opens up the above described first locking circuit for relay C1. The circuit for operating relay C2 at the beginning of the second impulse may be traced from (+), break contact of relay CB, make contact of relay SA, break contact of relay CX, make contact of relay C1 and winding of relay C2 to (—). It will be noted that relay CH0 is energized over the circuit for operating each counting relay. This circuit for relay CH0 is intermittently energized each time relay CB releases between impulses and since relay CH0 is slowing acting it maintains its break contact open until the end of the impulse transmission for the series.

When relay CB operates at the end of the second impulse the second locking circuit for relay C1 is opened for effecting the release of this latter relay. The operation of relay C2 closes a first locking circuit for itself extending from (+) at the lowermost make contact of relay SA, break contacts in series of relays C6 to C3 inclusive, make contact and winding of relay C2 to (—). When relay CB releases at the beginning of the third impulse a second locking circuit is closed for relay C2 extending from (+), lowermost make contact of relay SA, break contact of relay CB, break contacts in series of relays CX and C1, make contact and winding of relay C2 to (—). This release of relay CB closes an operating circuit for relay C3 extending below (+), break contact of relay CB, make contact of relay SA, break contacts of relays CX and C1 in series, make contact of relay C2 and winding of relay C3 to (—). The operation of relay C3 opens the first locking circuit for relay C2 at the same time that the first locking circuit for relay C3 is completed extending from (+), lowermost make contact of relay SA, break contacts in series of relays C6 to C4 inclusive, make contact and winding of relay C3 to (—).

It is not believed necessary to explain the operations of counting relays C4 and C5, since the operating and locking circuits for these relays are similar to those explained for relays C2 and C3. When relay CB releases to mark the beginning of the sixth impulse, relay C6 is operated over the above described operating circuit for the other counting relays including the inner, upper break contact of relay CB. Relay C6 closes a locking circuit for itself including the lowermost make contact of relay SA, this locking circuit being independent of the other counting relays, so that relay C6 remains operated during the transmission of the remaining impulses. When relay CB operates at the end of the sixth impulse the second locking circuit for relay C5 is opened at the lowermost break contact of relay CB for effecting the release of relay C5.

Relay CX is again operated over a circuit extending from (+), lowermost make contact of relay SA, make contact of relay C6, break contacts in series of relays C5 to C1 inclusive and winding of relay CX to (—). When relay CB releases to mark the beginning of the seventh impulse relay C1 is operated and locked and relay CX is locked over the previously described circuits, with relay CX being unlocked and released when relay CB operates at the end of the seventh impulse.

The next three impulses of the series of ten are effective to operate relay C2, release relay C1, operate relay C3, release relay C2, operate relay C4 and release relay C3 all in the previously described manner. Since this is the end of the series of impulses, relay C4 remains energized over the circuit extending from (+), lowermost make contact of relay SA, make contact of relay C6, break contacts in series of relay C5, make contact and winding of relay C4 to (—). Since this marks the end of the impulse transmission, relay CH0 is released for effecting the operation of the selected group or tens relay shown in the lower right hand portion of Fig. 2. Since ten impulses were transmitted, relay T00 is operated over a circuit extending from (+), lowermost make contact of relay SA, break contact of relay CH0, make contact of relay C6, make contact of relay C4, conductor 00 and winding of relay T00 to (—). Relay T00 closes a locking circuit for itself extending from (+), make contact of relay SA, conductor 11, make contact and winding of relay T00 to (—).

The operation of any one of the group relays (T00 in this example) closes a circuit for operating the trunk selecting relays. It will first be assumed that the first trunk in the selected group is idle, after which it will be assumed that the tenth trunk of the group is the only idle trunk in order to explain the reflex operation of the trunk selecting relays, including relays T1 to T5 inclusive, R1 and R2. A circuit is now closed for operating the first trunk selecting relay T1 extending from (+), make contact of relay SA, break contact of relay SW, conductor 25, make contact of relay T00, break contacts in series of relays T1 to T5 inclusive and winding of relay T1 to (—). The X contact of relay T1 closes first for completing a locking circuit for this relay extending from (+), make contact of relay SA, break contact of busy relay BY, conductor 28, break contacts in series of relays R1, T5, T4, T3, T2, make contact and winding of relay T1 to (—).

Since it is assumed that the first trunk in this group is idle, the 1CCB and ICSA relays will be deenergized and a circuit will now be closed for operating switching relay SW extending from (+), make contact of relay SA, upper winding of relay SW, break contact of busy relay BY, conductor 24, break contacts in series of relays R1, T5, T4, T3, T2, make contact of relay T1, conductor S1, make contact of relay T00, conductor S01, break contact of relay ICSA and resistor to (—). Relay SW closes a locking circuit for itself at its X contact (this contact making first) extending from (+), make contact of relay SA, make contact and lower winding of relay SW to (—). The operation of relay SW short circuits its upper winding for removing the resistance of this winding from the sleeve conductor.

The operation of relay SW extends the calling line conductors by way of make contacts of the SW relay, conductors 26 and 22, break contacts of relays R1 and R2, make contacts of relay T1, conductors T1 and R1, make contacts of relay T00, conductors T01 and R01 and windings of relay 1CCB to (+) and (—). Relay 1CCB operates and closes an obvious circuit for operating relay 1CSA and this relay in turn switches conductor S01 from (—) to (+) for making this trunk busy after relay SA of the selector is released. It will be understood that relays 1CCB and 1CSA are associated with the selected trunk of the next selector or connector. Since the operation of the relays of the next trunk is immaterial to an understanding of this invention, the operation of these additional trunk relays will be omitted.

It will now be assumed that trunk #10 is the only idle trunk in the selected group. Consequently, there is no circuit to (—) on any of the sleeve conductors of trunks 1 to 9 inclusive for stopping the trunk selection. This is effective to continue the selecting operation by means of the R1, R2 and relays T1 to T5 of Fig. 2. Relay T1 operates as before and closes a circuit for operating relay T2 extending from (+) on conductor 25 (since relay SW is not operated until the idle trunk is selected), make contact of relay T00, make contact of relay T1 and winding of relay T2 to (—). Relay T2 closes a locking circuit for itself over the above described circuit to (+) on conductor 28 and also opens up the locking circuit for relay T1 for effecting the release of this latter relay.

Relay T3 is now operated from (+) on conductor 25, make contact of relay T00, break contact of relay T1, make contact of relay T2 and winding of relay T3 to (—). The operation of relay T3 shifts the locking circuit, including conductor 28, from relay T2 to relay T3 for effecting the locking of relay T3 and the release of relay T2. The release of relay T2 extends (+) on conductor 25 by way of the lower make contact of relay T3 for operating relay T4. Relay T4 shifts the locking circuit from relay T3 to relay T4 for releasing relay T3 and for locking relay T4. The release of relay T3 extends the above described operating circuit by way of the lower break contact of relay T3 and the lower make contact of relay T4 for operating relay T5. Relay T5 shifts the above described locking circuit from relay T4 to relay T5 for releasing relay T4 and for locking relay T5.

This shows how the first selecting relays T1 to T5 are automatically operated for testing sleeve conductors S1 to S5 inclusive of the first 5 trunks. Since all of these trunks are assumed to be busy, a circuit is now closed for operating relay R1 extending from (+) on conductor 25, make contact of relay T00, break contacts of relays T1 to T4 in series, make contact of relay T5, break contact of relay R2 and winding of relay R1 to (—). The operation of relay R1 opens up locking conductor 28 for effecting the release of relay T5. The release of relay T5 closes a locking circuit for relay R1 and an operating circuit for relay R2 extending from (+) on conductor 28, winding of relay R2, make contact and winding of relay R1 to (—). This locking and operating circuit is completed when relay T5 opens up its lower make contact.

Relay T1 is again operated over the above described circuit and locked to conductor 28, since relay R2 closes a contact in multiple with the break contact of relay R1 which opened up the locking circuit. This provides a circuit for locking relay T1 and the operating circuit including conductor 25 is extended through the lower make contact of relay T1 to the winding of relay T2 for operating and locking this relay. The operation of relay T2 opens up the locking circuit for relay T1, this latter relay releases and extends the operating circuit through a break contact of relay T1 and a make contact of relay T2 to the winding of relay T3 for operating and locking this relay.

The operation of relay T3 opens the locking circuit of relay T2 for effecting the release of this latter relay. The release of relay T2 completes the operating circuit for relay T4 through a break contact of relay T2 and the operation of relay T4 closes a locking circuit for itself and effects the release of relay T3. The release of relay T3 completes the operating circuit for relay T5 which completes its locking circuit and opens up and releases relay T4.

With relays R1 and R2 operated, the sequential operation of relays T1 to T5 inclusive, tests the last five trunks of the group. Since it is assumed that the tenth trunk is idle, a circuit is now closed for operating relay SW extending from (+), uppermost make contact of relay SA, upper winding of relay SW, break contact of relay BY, conductor 24, make contact of relay R1, make contact of relay T5, sleeve conductor S0, make contact of relay T00, sleeve conductor S00, break contact of relay 10CSA and resistor to (−). Relay SW closes the previously described locking circuit for itself and short circuits its upper winding. This effects the selection of the trunk and extends the tip and ring conductors of the calling line by way of make contacts of relay SW, conductors 26 and 22, make contacts of relays R1 and R2, make contacts of relay T5, tip and ring conductors T0 and R0, make contacts of relay T00, tip and ring conductors T00 and R00 and windings of relay 10CCB to (+) and (−). Relay 10CCB operates over the calling line and closes an obvious circuit for operating relay 10CSA. The operation of relay SW opens up and releases relay CB which in turn releases relay SA. The release of relay SA disconnects (+) from the series circuit including the inner lower contacts of the counting relays of Fig. 1 for effecting the release of the relay or relays left operated, in this example relays C4 and C6. The release of relay CB closes an operating circuit for relay CH0, this circuit being opened for effecting the release of relay CH0 when relay SA releases. This momentary operation of relay CH0 at this time performs no function.

The application of (+) to the sleeve conductor of the selected trunk extends this circuit back by way of conductor 24 for locking relay SW and for holding the cut off relay of the calling line. The operation of relay SW applies (+) to conductors 9, 11 and 12 before (+) is removed from these conductors by the release of relay SA. The (+) for conductor 9 comes back over sleeve conductors S00 and S0. After the call has been extended to the called line and conversation is terminated, the opening of the calling line circuit effects the release of relays 10CCB and 10CSA. Now when relay 10CSA is released in response to the termination of the connection, (+) is removed from conductor 24 for releasing relay SW and the cut off relay of the calling line. Relay T00 is released when relay SW releases and removes (+) from conductor 11. Relays T5, R1 and R2 are released when relay SW releases for removing (+) from conductor 28.

In the event that all trunks of the selected group are busy, the trunk selecting relays will be stepped through for testing all ten trunks as previously described and since trunk #10 is busy, a circuit will be closed for operating relay BY instead of relay SW, this circuit extending from (+) on conductor 25, make contact of relay T00, break contacts in series of relays T1 to T4 inclusive, make contact of relay T5, make contact of relay R2, conductor 27 and winding of relay BY to (−). Relay BY closes a locking circuit for itself to (+) on conductor 11. Since relay SW is not operated in this example, relays CB, SA, C6 and C4 are not released until the calling party hangs up to effect the release of relays CB and SA. Busy tone is applied to the calling line over a circuit extending from the busy tone common, make contact of relay BY, condenser CN1, break contact of relay SW, conductors 7 and 6 and thence to the calling substation. Relay BY opens up conductor 24 to prevent the operation of relay SW if the connection is still held when trunk 10 becomes idle and (—) is applied to sleeve conductor S00.

Since relay SW does not operate, no relay corresponding to 1CCB or 10CCB is operated. After hearing the busy tone the calling party hangs up the receiver for releasing relay CB which again momentarily operates relay CH0 but which performs no function. Relay SA releases and opens up the locking circuit for relay BY and this relay releases, thus restoring the circuits to normal.

Having described an all relay type selector, it is desired to have it understood that this form is selected to facilitate the disclosure of the invention rather than to limit the number of forms which it may assume and it is to be further understood that various modifications, adaptations and alterations may be applied to the specific form shown to meet the requirements of practice without in any manner departing from the spirit or scope of the invention except as limited by the appended claims.

What I claim is:

1. In an automatic trunk selector, a first and a second trunk accessible to said selector, a series of trunk selecting relays permanently associated with said selector, means for automatically and successively operating said relays to search for and select said first trunk when idle, and means for again automatically and successively operating said relays to search for and select said second trunk when said first trunk is busy and said second trunk is idle.

2. In an automatic trunk selector, a first and a second plurality of trunks accessible to said selector during the establishment of a connection, a series of trunk selecting relays permanently associated with said selector, means for automatically and successively operating said relays to search for and select an idle trunk of said first plurality during the establishment of said connection, and means for again automatically and successively operating said relays to search for and select an idle trunk of said second plurality during the establishment of said connection if all trunks in said first plurality are busy.

3. In an automatic selector of the all relay type, a group of relays each adapted to connect simultaneously with a separate group of lines, means directively controlled in accordance with a digit in a called number for selecting and energizing one relay of said group of relays for selecting a particular group of lines, a chain of line selecting relays, means for automatically operating said line selecting relays through a first cycle to search for and connect with one of certain lines of said particular group, and means for automatically operating said line selecting relays through a second cycle to search for and connect with one of the remaining lines of said particular group if all of said certain lines are busy.

4. In an automatic trunk selector of the all relay type, a plurality of group relays each adapted to establish connections with a plurality of trunk lines, a chain of counting relays directively controlled in accordance with variable series of digit impulses for selecting one of said group relays, means for automatically energizing the selected group relay at the end of a series of impulses, a chain of trunk selecting relays less in number than the number of trunk lines connected to by said selected group relay, and means for selectively operating said trunk selecting relays to select any one of the trunk lines connected to by said selected group relay.

5. In an all relay type selector, a plurality of group relays each adapted to establish connections with a plurality of trunk lines, a chain of counting relays less in number than the number of said group relays, means responsive to variable series of digit impulses for directively controlling said counting relays for selecting any one of said group relays, means for automatically energizing the selected group relay at the end of a series of impulses, a chain of trunk selecting relays less in number than the number of trunks in any of said plurality of trunk lines, and means for selectively operating said trunk selecting relays to select any one of said plurality of trunk lines in any selected group.

6. In a trunk selector adapted to perform a directive selective operation and a subsequent automatic selective operation, an impulse relay, a series of counting relays, a group selecting relay for selecting a group of trunks, means for operating said counting relays under the control of said impulse relay during the directive operation of said selector, means including an operated counting relay for operating said group selecting relay, a series of trunk selecting relays, and means for sequentially and repeatedly operating certain of said trunk selecting relays during the automatic operation of said selector for selecting an individual trunk of the group selected by said operated group selecting relay.

7. In a trunk selector adapted to perform a directive selective operation and a subsequent automatic selective operation, an impulse relay, a series of counting relays, a plurality of group selecting relays each selecting a group of trunks, means for operating said counting relays under the control of said impulse relay during the directive operation of said selector, means including an operated counting relay for operating one of said group selecting relays, a series of trunk selecting relays, and means for sequentially and repeatedly operating certain of said trunk selecting relays during the automatic operation of said selector for selecting an individual trunk of the group selected by said one group selecting relay.

8. In a trunk selector adapted to perform a directive selective operation and a subsequent automatic selective operation, an impulse relay, a busy relay, a series of counting relays, a plurality of group selecting relays each selecting a group of trunks, means for operating said counting relays under the control of said impulse relay during the directive operation of said selector, means including an operated counting relay for operating one of said group selecting relays, a series of trunk selecting relays, means for sequentially and repeatedly operating certain of said trunk selecting relays during the automatic operation of said selector for selecting an individual trunk of the group selected by said one group selecting relay, and means for automatically operating said busy relay during said automatic operation of the selector when all trunks of a selected group are busy.

9. In an automatic selector of the all relay type, an incoming trunk, a group of outgoing trunks divided into first and second sub-groups, a plurality of counting relays controlled over said incoming trunk to select said group of outgoing trunks, a series of trunk selecting relays, means for automatically and successively operating said trunk selecting relays to test the trunk lines in one of said sub-groups in rotation in search of an idle trunk line, means for again automatically and successively operating said trunk selecting relays to test the trunk lines in the other of said sub-groups in rotation in search of an idle trunk line in case all of the trunks in said one sub-group are busy, and means for connecting said incoming trunk to the selected idle outgoing trunk.

10. In an automatic selector of the all relay type, an incoming trunk, a plurality of groups of outgoing trunks each divided into first and second sub-groups, a plurality of counting relays controlled over said incoming trunk to select one of said groups of outgoing trunks, a series of trunk selecting relays, means for automatically and successively operating said trunk selecting relays to test the trunk lines in one of said sub-groups in rotation in search of an idle trunk line, means for again automatically and successively operating said trunk selecting relays to test the trunk lines in the other of said sub-groups in rotation in search of an idle trunk line in case all of the trunks in said one sub-group are busy, and means for connecting said incoming trunk to the selected idle outgoing trunk.

11. In an automatic trunk selector of the all relay type, an incoming line, a group of outgoing lines, a group relay individual to said group of outgoing lines, said group of outgoing lines being divided into a primary sub-group and a secondary sub-group, a series of trunk selecting relays less in number than the total number of outgoing lines in said primary and secondary sub-groups, means responsive to selective control over said incoming line for operating said group relay, control means responsive to the operation of said group relay for initiating the sequential operation of said trunk selecting relays, means including said trunk selecting relays for sequentially testing the busy or idle condition of the primary outgoing lines in said group, means responsive to the testing of said primary outgoing lines for stopping the sequential operation of said trunk selecting relays at a point corresponding to an idle trunk in said primary sub-group, means responsive to all outgoing lines in said primary sub-group testing busy for causing the reflex operation of said trunk selecting relays for sequentially testing the outgoing lines in said secondary sub-group, means responsive to the testing of said secondary outgoing lines for stopping the sequential operation of said trunk selecting relays at a point corresponding to an idle trunk in said secondary sub-group, and means for connecting said incoming line to the first idle outgoing line tested.

12. In an automatic trunk selector of the all relay type, an incoming line, groups of outgoing lines, a group relay individual to each group of outgoing lines, each group of outgoing lines being divided into primary sub-groups and secondary sub-groups, a series of trunk selecting relays less in number than the total number of outgoing lines in any one of said primary and secondary sub-groups, means responsive to selective control over said incoming line for operating one of said group relays, control means responsive to the operation of said one group relay for initiating the sequential operation of said trunk selecting relays, means including said trunk selecting relays for sequentially testing the busy or idle condition of the primary outgoing lines in the group to which said one group relay is individual, means responsive to the testing of said primary outgoing lines for stopping the sequential operation of said trunk selecting relays at a point corresponding to an idle trunk in said primary sub-group, means responsive to all outgoing lines in said primary group testing busy for causing a reflex operation of said trunk selecting relays for sequentially testing the outgoing lines of said secondary sub-group, means responsive to the testing of said secondary outgoing lines for stopping the sequential operation of said trunk selecting relays at a point corresponding to an idle trunk in said secondary sub-group, and means for connecting said incoming line to the first idle outgoing line tested.

ROY W. JONES.

REFERENCES CITED

The following references are of record in the file of this patent:

UNITED STATES PATENTS

| Number | Name | Date |
|---|---|---|
| 2,279,531 | Saunders | Apr. 14, 1942 |
| 2,410,304 | Powell | Oct. 29, 1946 |
| 2,431,850 | Voss | Dec. 2, 1947 |